(12) United States Patent
Kurtz et al.

(10) Patent No.: US 10,243,505 B1
(45) Date of Patent: Mar. 26, 2019

(54) WIRE MANAGEMENT RACKING SYSTEM FOR PHOTOVOLTAIC SOLAR MODULES

(71) Applicants: Michael Kurtz, Ringoes, NJ (US);
Mark Kurtz, Ringoes, NJ (US)

(72) Inventors: Michael Kurtz, Ringoes, NJ (US);
Mark Kurtz, Ringoes, NJ (US)

(73) Assignee: RACEWAY RACKING, INC., Reading, PA (US)

( * ) Notice: Subject to any disclaimer, the term of this patent is extended or adjusted under 35 U.S.C. 154(b) by 3 days.

(21) Appl. No.: 15/451,509

(22) Filed: Mar. 7, 2017

Related U.S. Application Data (60) Provisional application No. 62/304,593, filed on Mar. 7, 2016.

(51) Int. Cl.
| | | |
|---|---|---|
| *H01L 31/048* | (2014.01) | |
| *H02S 20/23* | (2014.01) | |
| *H02S 30/10* | (2014.01) | |
| *H02S 20/10* | (2014.01) | |
| *H02S 20/30* | (2014.01) | |
| *H02S 40/42* | (2014.01) | |

(52) U.S. Cl.
CPC .............. *H02S 20/23* (2014.12); *H02S 20/10* (2014.12); *H02S 20/30* (2014.12); *H02S 30/10* (2014.12); *H02S 40/425* (2014.12)

(58) Field of Classification Search
CPC .......... H02S 20/23; H02S 20/10; H02S 20/30; H02S 30/10; H02S 40/425
USPC ........................................................ 136/251
See application file for complete search history.

(56) References Cited

U.S. PATENT DOCUMENTS

| | | | |
|---|---|---|---|
| 4,636,577 A | 1/1987 | Peterpaul | |
| 5,404,822 A * | 4/1995 | Jaskiewicz | ........... A47B 96/062 |
| | | | 108/108 |
| 6,111,189 A | 8/2000 | Garvison | |

(Continued)

FOREIGN PATENT DOCUMENTS

| | | |
|---|---|---|
| EP | 2525165 A1 | 4/2012 |
| WO | 2013043599 A2 | 3/2013 |

(Continued)

OTHER PUBLICATIONS

Jacoby, Tommy, PV Array Wire Management, Solar Pro Magazine, Issue 6.2, Feb./Mar. 2013, pp. 1-11.

*Primary Examiner* — Jayne L Mershon
(74) *Attorney, Agent, or Firm* — McNees Wallace & Nurick LLC (57) ABSTRACT

A framed PV module rooftop and ballasted ground mount racking system by which the mounting structure also functions as a wire management system and operates as an electrical raceway that includes a plurality of North-South mounting structures, oriented in a North-South direction, each of the North-South mounting structures including a North-South open-air channel for receiving wires, and each of the North-South mounting structures configured for supporting a solar module at a selected tilt angle; a plurality of East-West mounting structures, oriented in an East-West direction, each of the East-West mounting structures including an East-West open-air channel for receiving wires, wherein the coupling of said North-South mounting structures to said East-West mounting structures forms a continuous, open-air, electrical raceway with intersections within an array for module connectivity.

20 Claims, 9 Drawing Sheets

(56) References Cited

U.S. PATENT DOCUMENTS

| | | |
|---|---|---|
| 6,617,507 B2 | 9/2003 | Mapes et al. |
| 8,171,679 B2 | 5/2012 | Brescia et al. |
| 2003/0070368 A1 | 4/2003 | Shingleton |
| 2004/0056162 A1* | 3/2004 | Cole ................. A47G 33/10 248/227.1 |
| 2010/0071278 A1* | 3/2010 | Brescia ................. E04B 2/88 52/173.3 |
| 2010/0243023 A1* | 9/2010 | Patton ................. F24J 2/4607 136/244 |
| 2011/0000519 A1* | 1/2011 | West ................. F24J 2/5211 136/244 |
| 2011/0220596 A1 | 9/2011 | Cusson et al. |
| 2011/0302857 A1 | 12/2011 | McClellan et al. |
| 2012/0090666 A1* | 4/2012 | Rowe ................. H02G 3/30 136/251 |
| 2012/0117895 A1 | 5/2012 | Li |
| 2012/0211252 A1 | 8/2012 | Turziano et al. |
| 2014/0130849 A1* | 5/2014 | Silberschatz ........... H02S 30/10 136/251 |
| 2015/0357967 A1 | 12/2015 | Brennan et al. |
| 2016/0111996 A1 | 4/2016 | Stephan et al. |
| 2016/0190979 A1* | 6/2016 | Wildes ................. H02S 20/30 136/251 |
| 2017/0093328 A1* | 3/2017 | Wylie ................. H02S 20/23 |

FOREIGN PATENT DOCUMENTS

| | | |
|---|---|---|
| WO | 2013092682 A2 | 6/2013 |
| WO | 2014030045 A1 | 2/2014 |

* cited by examiner

WIRE MANAGEMENT RACKING SYSTEM FOR PHOTOVOLTAIC SOLAR MODULES

CROSS-REFERENCE TO RELATED APPLICATION

This application claims the benefit of U.S. Provisional Patent Application No. 62/304,593, which was filed on Mar. 7, 2016, the entire contents of which are hereby incorporated by reference.

FIELD OF THE INVENTION

The invention relates generally to racking systems for solar modules, and more particularly, to racking systems with electrical raceways onto which solar modules are mounted.

BACKGROUND OF THE INVENTION

Many racking systems for mounting or supporting photovoltaic (PV) solar panels or modules on roofs or on the ground are commercially available. PV systems are expected to have a 25-year lifespan, and array wire management solutions should match this expectancy. However, designers and installers face persistent challenges to managing free-air conductors within the PV array.

Implementing a safe, reliable and Code-compliant wire management system for exposed PV conductors is not an easy task. PV module leads can be too long or sometimes too short, requiring site-specific solutions for supporting and interconnecting the cables. Equipment grounding, PV source-circuit and inverter-output conductors from micro-inverters and alternate current (AC) modules must also be managed to ensure protection from potential damage. Within the PV array, these various conductors are often secured to module frames, support rails and other racking system components. While securing array wiring seems as though it should be a straightforward exercise, the reality is that integrators continue to face numerous challenges.

UV-rated plastic wire ties provide a flexible, convenient and low-cost solution for bundling and fastening array conductors, but they are not a permanent answer and require regular inspection and replacement. Stainless steel cable clips work well for attaching conductors to the module frame, but this solution is often limited to supporting only one or two conductors at a time, and not all modules have frames. Structural channels or integrated cable management solutions within the module support rails assist with protecting and routing conductors, yet precautions must be taken where conductors enter and exit the channels to protect them from sharp edges that may compromise their insulation. In addition, module rails tend to run either east-west or north-south, but not both, so the rails may not provide support where conductors run perpendicular to the particular rail alignment.

Unfortunately, the PV industry lacks consistent, standardized wire management solutions for free-air conductors within the array. Coupled with the harsh environmental conditions that PV array conductors are exposed to—UV radiation, high winds and extreme ambient temperatures, and ice, snow and other debris—wire management continues to be the Achilles heel of the majority of PV installations.

The majority of PV systems have integrated leads, or wires, used for making electrical connections between modules. The module leads and the associated homerun conductors are often installed in free air within the PV array—meaning they are not in conduit. These exposed circuits contain potentially lethal voltages and currents that could electrocute someone, or cause a fire, in a faulted condition.

Although many racking systems are available, it has been found that the systems do not provide labor predictability, or provide predictable results based on structural needs or on-site requirements.

As a result, there remains a need for wire management solutions that can endure the extreme environments in which PV arrays are installed while ensuring the systems are safe and reliable.

SUMMARY OF THE INVENTION

Briefly described, A framed photovoltaic (PV) module racking system includes: a North-South oriented sub-assembly, including: a plurality of North-South (NS) mounting structures, oriented in a North-South direction, each of the NS mounting structures including an NS open-air channel; a plurality of NS secondary mounting structures, each of the NS secondary mounting structures coupled to and supporting one of the NS mounting structures; an East-West oriented sub-assembly, including: a plurality of East-West (EW) mounting structures, oriented in an East-West direction, each of the EW mounting structures including an EW open-air channel; a key connector interconnecting each of the NS mounting structures to each of the EW mounting structures; wherein, the coupling of the NS mounting structures to said East-West mounting structures forms an integrated framework, wherein the NS oriented sub-assembly supports a plurality of framed photovoltaic (PV) modules, and wherein the NS open-air channel and said EW open-air channel forms an interconnected electrical raceway with a plurality of intersections within a solar module array.

According to another aspect of the invention, a method for mounting a racking system for framed photovoltaic (PV) modules includes: providing a North-South oriented sub-assembly, including: a plurality of North-South (NS) mounting structures, oriented in a North-South direction, each of the NS mounting structures including an NS open-air channel; a plurality of NS secondary mounting structures, each of the NS secondary mounting structures coupled to and supporting one of the NS mounting structures; providing an East-West oriented sub-assembly, including: a plurality of East-West (EW) mounting structures, oriented in an East-West direction, each of the EW mounting structures including an EW open-air channel; interconnecting each of the NS mounting structures to each of the EW mounting structures with a key connector; wherein, the coupling of the NS mounting structures to the East-West mounting structures forms an integrated framework, wherein the NS oriented sub-assembly supports a plurality of framed photovoltaic (PV) modules, and wherein the NS open-air channel and the EW open-air channel forms an interconnected electrical raceway with a plurality of intersections within a solar module array.

BRIEF DESCRIPTION OF THE DRAWINGS

Throughout the drawings, like reference numerals are used to indicate common features of the described wire management racking system and method for mounting PV solar modules.

FIG. 9b is a bottom isometric view of the rubber base foot pads of FIG. 9a;

FIG. 10b is a bottom plan view of the ballast bracket of FIG. 10a;

FIG. 11b is a bottom plan view of the strut bracket of FIG. 11a;

FIG. 12 is an exploded view of the East-West (E-W) oriented sub-assembly in conjunction with the N-S sub-assembly according to an aspect of the invention;

FIG. 12a is an enlarged view of the rubber insert of FIG. 12;

FIG. 13a is a bubble view of the key connector disposed onto the racking system at an intersection of the N-S and E-W framework;

FIG. 13b is a bubble view of the rubber insert disposed onto the key connector of FIG. 13a;

FIG. 16b is an isometric view of the assembled clamp of FIG. 16a;

The above-identified drawing figures set forth several embodiments of the invention. Other embodiments are also contemplated, as disclosed herein. The disclosure represents the invention, but is not limited thereby, as it should be understood that numerous other modifications and embodiments may be devised by those skilled in the art which fall within the scope and spirit of the invention as claimed.

DETAILED DESCRIPTION OF THE INVENTION

The terms "a" or "an" as used herein are to describe elements and components of the invention. This is done merely for convenience and to give a general sense of the invention. The description herein should be read to include one or at least one and the singular also includes the plural unless indicated to the contrary.

The term "comprises", "comprising", "includes", "including", "as", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

Figure 1:
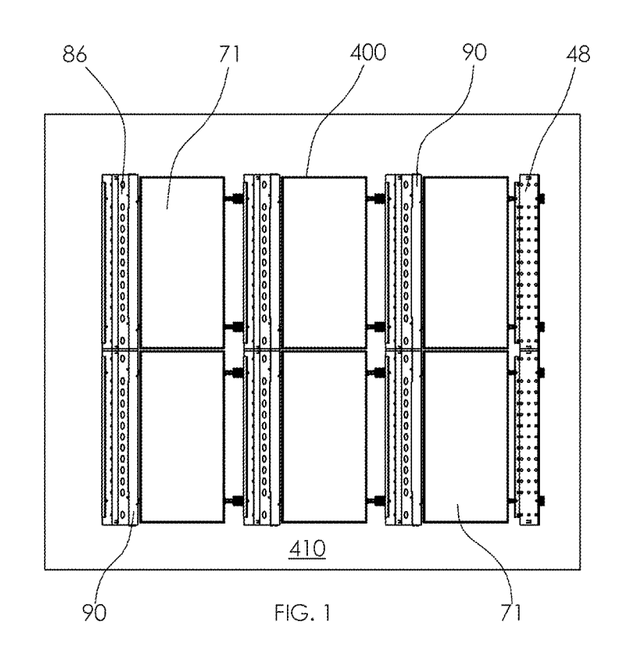
FIG. 1 is a top plan view of a fully assembled racking system with solar panels coupled thereto according to an aspect of the invention.
Figure 2:
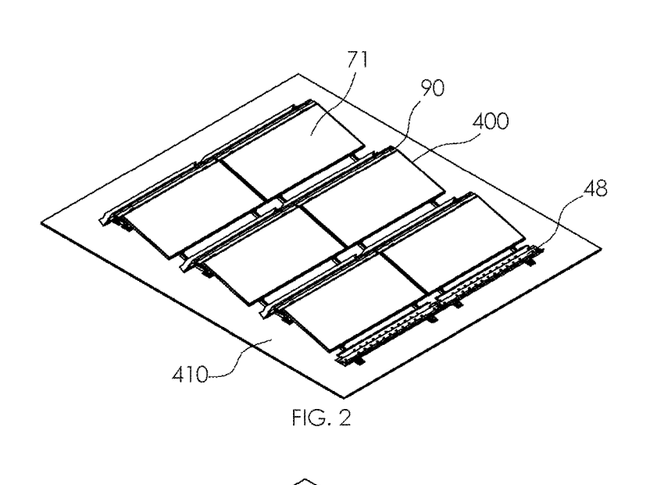
FIG. 2 is an isometric view of the fully assembled racking system of FIG. 1.
Figure 3:
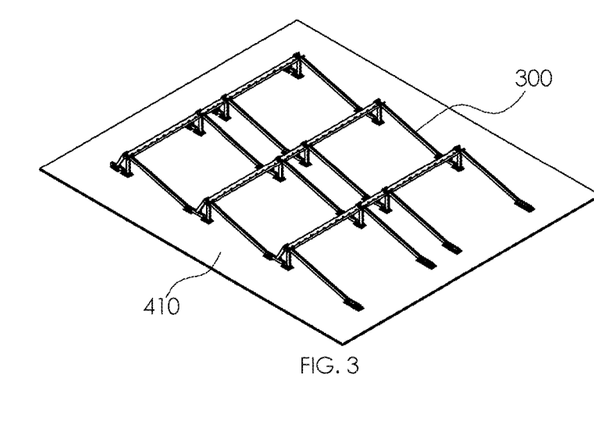
FIG. 3 is an isometric view showing the framework of the underlying racking system of FIGS. 1 and 2 with the solar panels removed.
Figure 4:
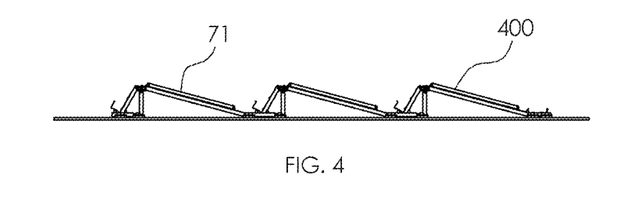
FIG. 4 is a side plan view of the racking system of FIGS. 1 and 2.

Referring to FIG. 1, a top plan view of an exemplary, fully-assembled racking system 400 with solar panels 71, ballast 86, ballast 48, and elongate caps 90 coupled thereto is illustrated as mounted on a suitable surface 410, for example, a roof or the ground. Referring to FIG. 2, an isometric view of the exemplary system 400 is also illustrated as mounted on a suitable surface 410. Referring to FIG. 3, the framework of the underlying racking system 300 is illustrated. A side view of the fully-assembled racking system 400 of FIGS. 1 and 2 is illustrated in FIG. 4.

Figures 5, 6, 7:
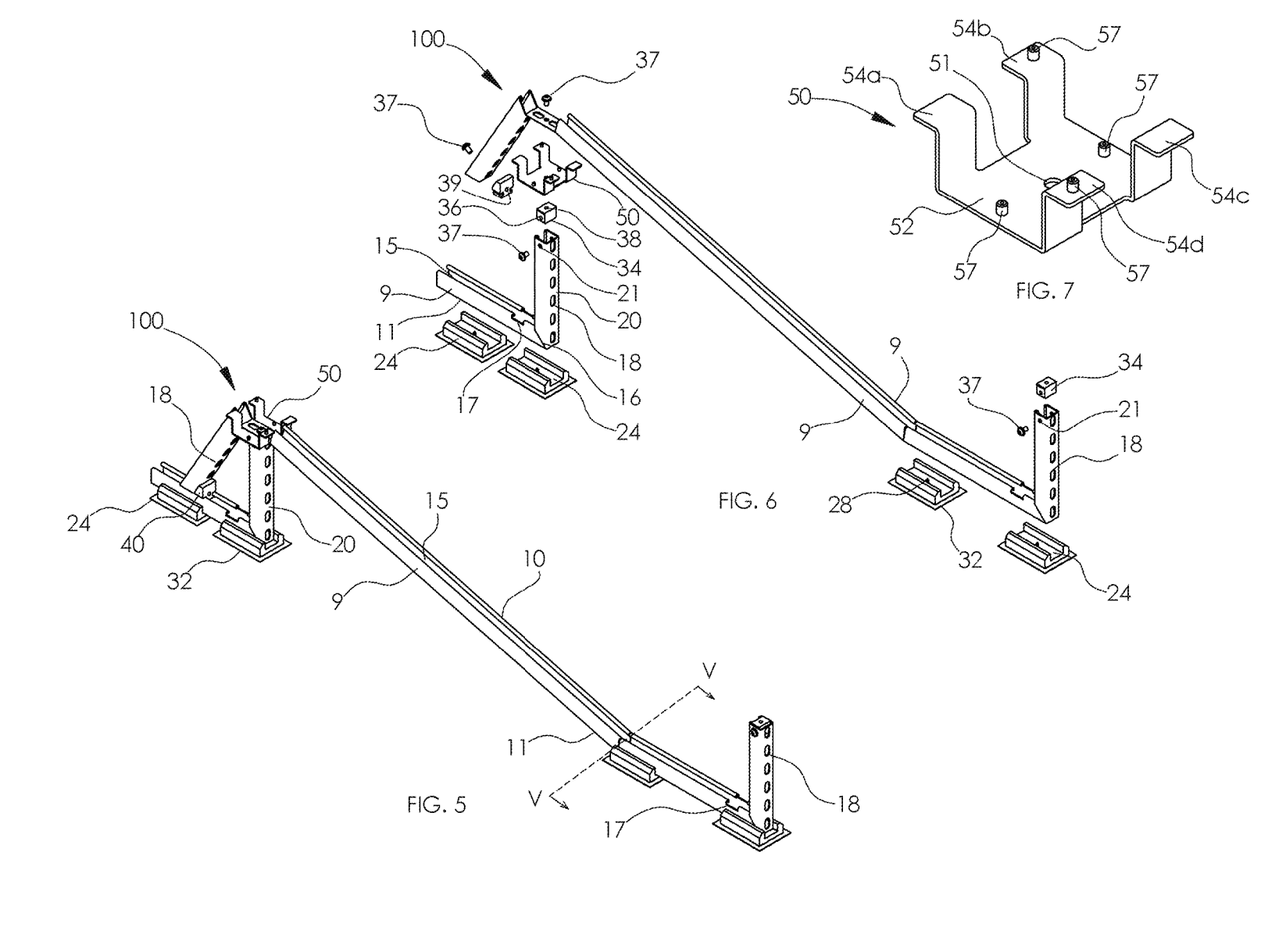
FIG. 5 is an isometric view of the North-South (N-S) oriented sub-assembly of the racking system according to an aspect of the invention.
FIG. 6 is an exploded view of the N-S oriented sub-assembly of FIG. 5.
FIG. 7 is an enlarged view of the key connector of FIGS. 5 and 6.
Figure 8:
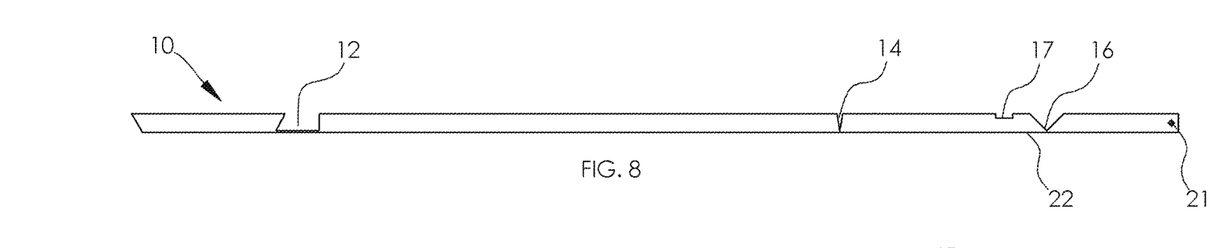
FIG. 8 is a side view of the main strut illustrated in FIGS. 5 and 6.

Referring to FIG. 5, a North-South (NS) sub-assembly 100 of the racking system 300 of FIG. 3 is illustrated as assembled. Referring to FIG. 6, an exploded view of the NS sub-assembly 100 is illustrated. Referring to FIG. 8, the main strut mounting structure 10 of the NS sub-assembly 100 is illustrated in a side view. As illustrated in FIG. 8, the main strut 10 includes at least three notches, 12, 14, and 16. The left side of notch 12 is cut at an angle of approximately 45 degrees, whereas the right side of notch 12 is cut at an angle of approximately 90 degrees. Notches 14 and 16 are essentially V-shaped. An additional slotted square-shaped notch 17 is also present.

Notches 12, 14, and 16 allow the main strut 10 to be rotated or pivoted at the respective notches and positioned for receiving a solar module or panel 71, and associated elements as described hereinafter. The positioning of the main strut 10 of FIG. 8 can be seen in FIGS. 5 and 6. In many installations, the variable in the tilt angle of the panel 71 ranges between 5 and 15 degrees. It should be understood, however, that the variable in the tilt angle of the solar module will be determined by the orientation to the sun, and other considerations, including wind and load factors, and may be outside the stated range.

Figure 16A:
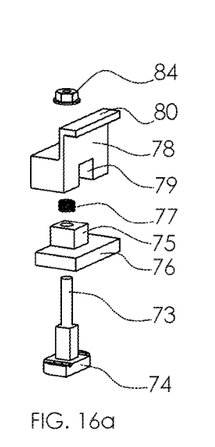
FIG. 16a is an exploded view of a clamp of FIG. 15 according to an aspect of the invention.
Figure 16B:
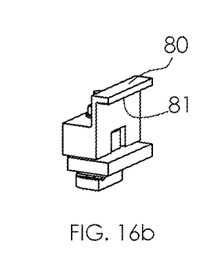
Figure 16C:
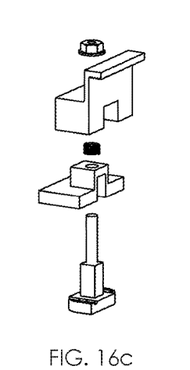
FIG. 16c is an alternate exploded view of a clamp according to an aspect of the invention.
Figure 16D:
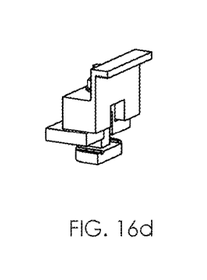
FIG. 16d is an isometric view of the assembled clamp of FIG. 16d.
Figure 16E:
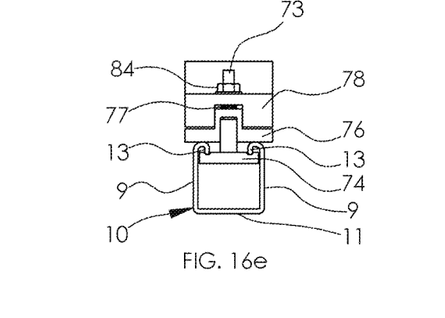
FIG. 16e is a cross-sectional view of the clamp disposed in the N-S sub assembly main strut channel.

Referring still to FIGS. 5 and 6, in the NS sub-assembly 100, a main strut 10 is illustrated with a base 11 and two sides 9 extending vertically from the base 11. In the area between the base 11 and two sides 9, an open-air channel or groove 15 for receiving wires is illustrated. Channel 15 has a substantially U-shaped cross-section, and each end of each side 9 terminates with an inwardly curling flange 13 (FIG. 16e). Main strut 10 also includes apertures 18 extending along the length thereof.

Secondary strut 20 and key connector 50 are employed to connect with the northerly end of main strut 10 as hereinafter described. Secondary strut 20 has geometry similar to the southerly end of the main strut 10, as indicated along lines V-V of FIG. 5. Secondary strut 20 also includes a base 11 and two sides 9 with apertures 18 disposed along the length of the base 11, as with main strut 10. A channel 15 is also formed as with main strut 10. Main strut 10 and secondary strut 20 each include an aperture 21 for coupling with strut cap 34. Secondary strut 20 also has a V-shaped notch 16, similar to notch 16 of main strut 10 (FIG. 8), as can be readily understood. During assembly, secondary strut 20 is bent at the V-shaped notch, thereby forming essentially two perpendicularly adjacent legs, and positioned in essentially a reversed L-shaped configuration, i.e., one leg of the secondary strut 20 is approximately 90 degrees apart from the other leg as illustrated.

Figure 9A:
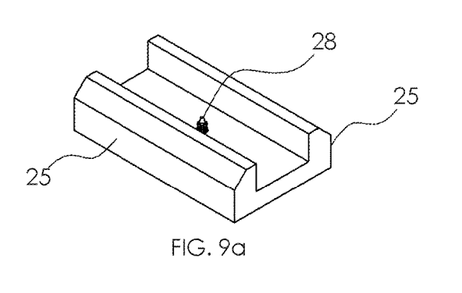
FIG. 9a is a top isometric view of the rubber base foot pads illustrated in FIGS. 5 and 6.
Figure 9B:
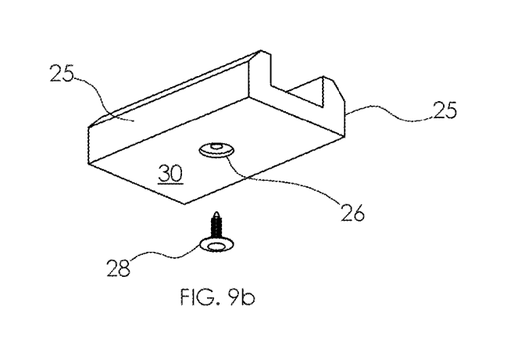

Upon the bending or rotating of the secondary strut 20 into position at the respective notch 16, the strut 20 may be placed into rubber base foot pads 24. As illustrated in FIGS. 9a and 9b, the base foot pads 24 have two sides 25, and a countersink aperture 26 extending through the base of the foot pads 24 for receiving a fastener 28, for example, a plastic clip. The horizontal leg of secondary strut 20 includes a complementary aperture 22 (FIG. 8) for receiving the fastener 28. Foot pads 24 also include an adhesive layer 30 (FIG. 9a) disposed on the underside thereof which is disposed onto a rubber mat or other suitable code-compliant insulating or roofing material 32, which is mounted onto a surface 410, for example a roof.

Cube-shaped strut cap 34 is disposed into the upper channel of secondary strut 20, and fastened thereto with fastener 37, for example a bolt, through aperture 36. A key connector 50 with centrally-disposed aperture 51 that extends therethrough is disposed onto the strut cap 34 and aperture 51 is aligned with aperture 38. The northerly end of main strut 10 is placed over key connector 50, aligned with aperture 51, and coupled thereto with fastener 37 through an aperture in the main strut 10.

Referring to FIG. 7, key connector 50 includes base member 52, and four bent arm members 54a, 54b, 54c, and 54d. Arm members 54a, 54b, 54c, and 54d extend perpendicularly from the horizontal base member 52 a selected distance, and thereafter extend outwardly a selected distance. As illustrated in FIG. 7, arm members 54b and 54d include screws 57 for coupling with cap 90 and ballast 86 as will be described in reference to FIG. 17a and FIG. 15b respectively. Key connector 50 also includes screw 57 on the base member 52, for coupling with the E-W sub-assembly, as will be described with reference to FIG. 13a.

Figure 11A:
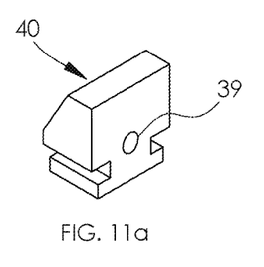
FIG. 11a is a top isometric view of a strut bracket according to an aspect of the invention.
Figure 11B:
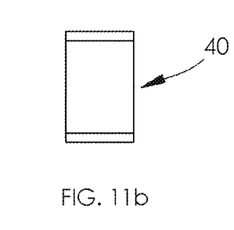

Referring to FIGS. 5 and 6, the northerly end of main strut 10 is coupled to the secondary strut 20 via secondary strut bracket 40 (also illustrated in FIGS. 11a and 11b) by placing the t-shaped bracket 40 into the slotted square-shaped notch 17 of the secondary strut 20 and sliding along the length of the channel 15 toward the northerly end of the main strut 10 and fastening to the main strut 10 through aperture 39 with bolt 37. As illustrated, the face of the bracket 40 has a complementary geometry to that of the strut 20. The southerly end of main strut 10 with a strut cap 34 attached, is also placed into rubber base foot pads 24, as described above, and positioned to receive the northerly end of a second main strut 10. The repeated coupling of the NS mounting structures to each other continues until the desired length of the NS mounting surface is attained.

Figures 12, 12A, 13A, 13B:
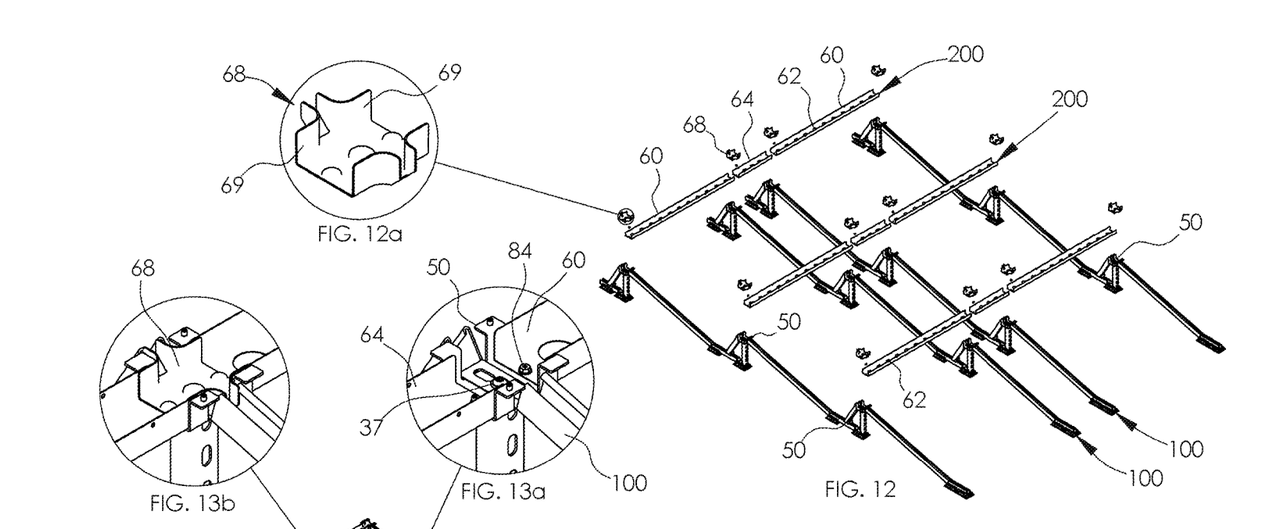
Figure 13:
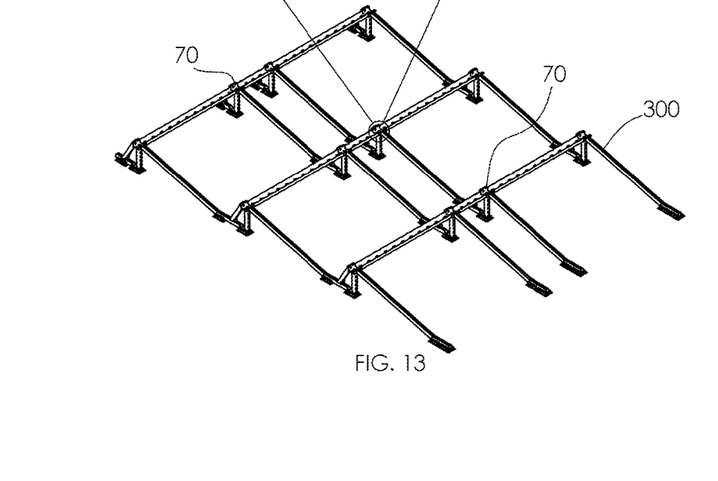
FIG. 13 is an isometric view of the assembled N-S and E-W racking system framework according to an aspect of the invention.
Figure 14:
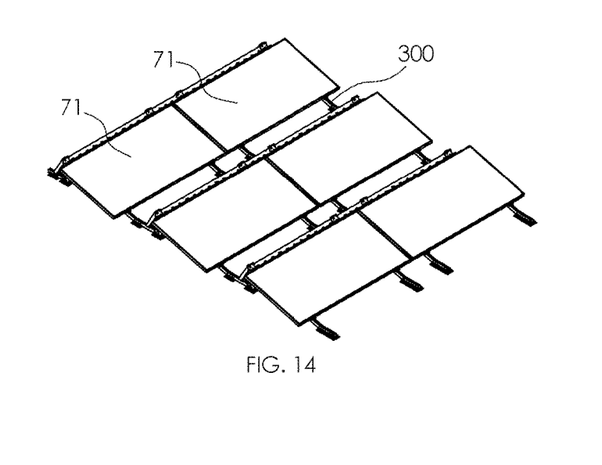
FIG. 14 is an isometric view of six solar panels coupled to the framework of the racking system according to an aspect of the invention.

Referring now to FIG. 12, a plurality of EW sub-assembly mounting structures 200 are illustrated. The EW sub-assembly mounting structures 200 include outer struts 60 and inner strut 64. Each outer strut 60 and inner strut 64 include apertures 62 extending along the length thereof. Outer struts 60 are elongate, whereas inner strut is shorter in length to provide the appropriate spacing between panels 71. Each outer strut 60 and inner strut 64 are coupled to the NS mounting structures 100 with nuts 84 as illustrated in FIG. 13a. A rubber insert 68 having a complementary shape and geometry to the assembled intersection 70 of NS and EW structures, as illustrated in FIGS. 12a and 13b, is disposed over the assembled intersection 70 of the NS and EW mounting structures. The rubber insert 68 includes four raised rounded portions 69 that protect the wiring during installation or removal, by covering the potentially rough edges of the adjacent mounting structures. Referring to FIG. 14, a set of six solar panel modules 71 is disposed on the racking system framework 300.

Figure 15:
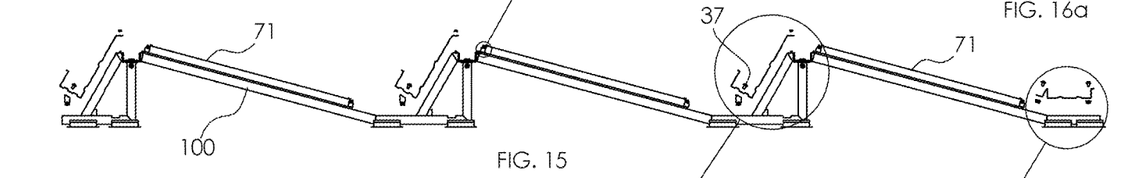
FIG. 15 is a side view of the racking system with solar panels coupled thereto via clamps according to an aspect of the invention.
Figure 15A:
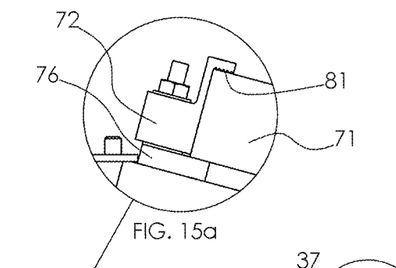
FIG. 15a is a bubble view of the clamps of FIG. 15.

Referring now to FIGS. 15 and 15a, solar modules 71 are coupled to the NS mounting structures 100 with adjustable clamps 72. Spring-loaded clamp 72, illustrated in an exploded view in FIG. 16a includes clamp bolt 74, clamp base 76, spring 77, clamp top 78 and nut 84. Clamp bolt 74 has an essentially rectangular cuboid shaped base with a rectangular cuboid raised portion and a post 73 extending therefrom. Clamp base 76 has a rectangular cuboid shape with a smaller, cube-shaped raised portion 75 disposed thereon. The cube-shaped portion 75 includes an aperture for receiving the post 73 and spring 77. Clamp top 78, having a substantially rectangular cuboid shape, includes an opening 79 for receiving cube-shaped portion 75 and the spring 77. Clamp top 78 also includes a serrated or saw-toothed geometry 81 disposed under ledge 80.

For solar panel array installations where the solar panel 71 is "thin", spring-loaded clamp 72 is used as in the configuration illustrated in FIG. 15a, where the solar panel 71 rests on a portion of the clamp base 76. For installation where the solar panel 71 is wider, the clamp base 76 may be adjusted for the increase in height by rotating the clamp base 76 by 180 degrees, as illustrated in FIGS. 16c and 16d. In that situation, it should be understood that the panel 71 would rest directly on the NS mounting structure 100, and not the clamp base 76. Referring to FIG. 16e, the spring-loaded clamp 72, in channel 15, is illustrated in cross-section.

Figure 10A:
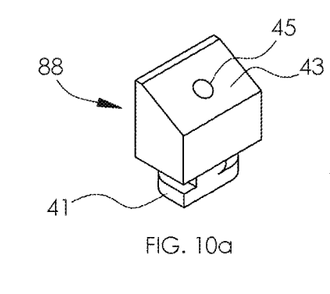
FIG. 10a is a top isometric view of a ballast bracket according to an aspect of the invention.
Figure 10B:
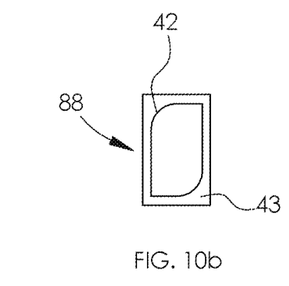
Figures 15B, 15C:
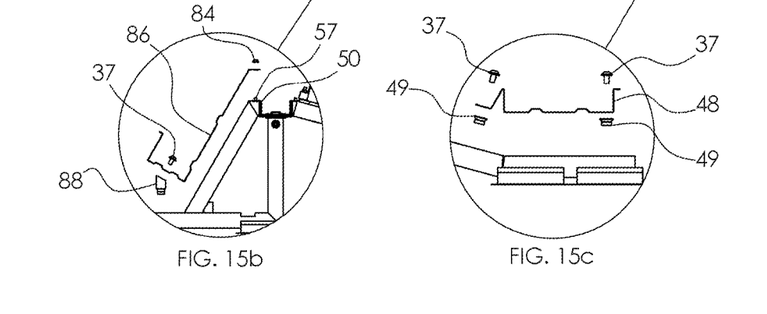
FIG. 15b is a bubble view of the ballast that is to be coupled to the framework adjacent a solar panel.
FIG. 15c is a bubble view of the ballast of FIG. 15.

Referring to FIG. 15b, a ballast shield and wind deflector 86 is illustrated prior to attachment to the northerly end of the NS mounting structures 100. Ballast shield 86 is coupled to the NS mounting structures 100 by ballast bracket 88 and bolt 37. Ballast shield 86 is also coupled to the NS mounting structures 100 with nut 84 onto screw 57 of key connector 50. Ballast bracket 88 is illustrated in FIGS. 10a and 10b.

Ballast bracket 88 is essentially t-shaped in cross-section, and includes a base 41 with a cutaway portion 42, a substantially hexagonal-shaped bracket top 43 and an aperture 45 extending through the top 43. The cutaway portion 42 allows the bracket 88 to be placed sideways into channel 15 of main strut 10 where space is limited (not enough length to include a notch 17) and rotated 90 degrees to ensure a strong connection with main strut 10.

Referring to FIG. 15*c*, at the southerly end of the racking structure, a ballast shield and wind deflector 48 is illustrated prior to attachment to the southerly end of the NS mounting structures 100. Ballast shield 48 is coupled to the NS mounting structures 100 by commercially available strut cone nut 49 and bolt 37.

Figures 17, 18, 18A, 18B:
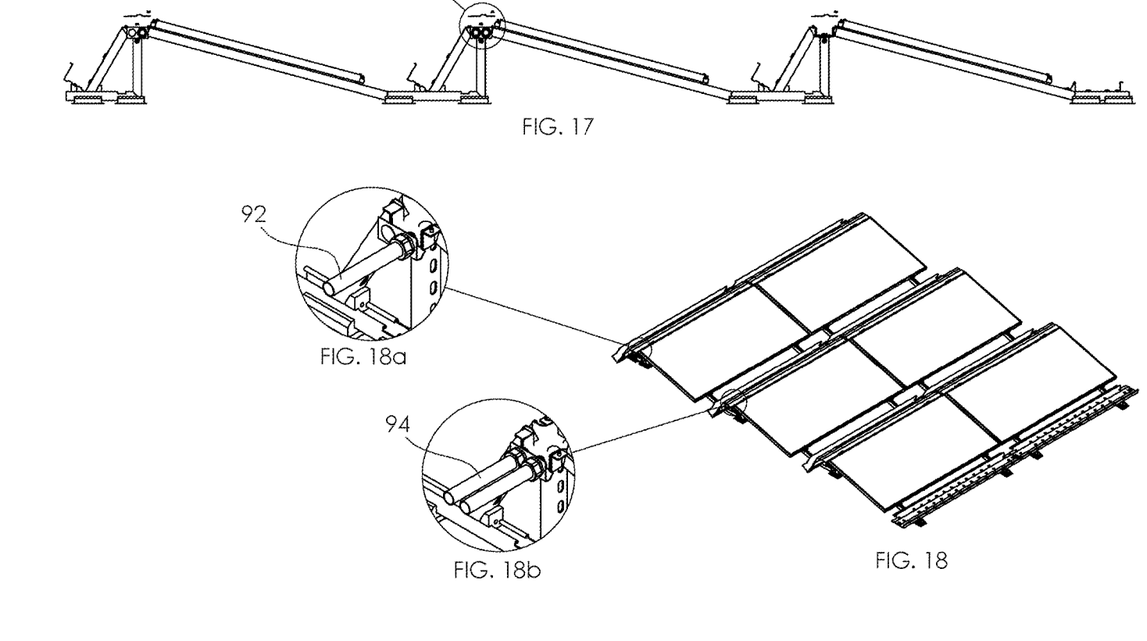
FIG. 17 is a side view of the racking system with caps (prior to placement onto the racking structure in an E-W orientation)
FIG. 18 is an isometric view of the assembled racking system with solar panels, ballasts, and caps coupled thereto.
FIG. 18a is an isometric bubble view of a single conduit connector according to an aspect of the invention.
FIG. 18b is an isometric bubble view of a double conduit connector according to an aspect of the invention.
Figure 17A:
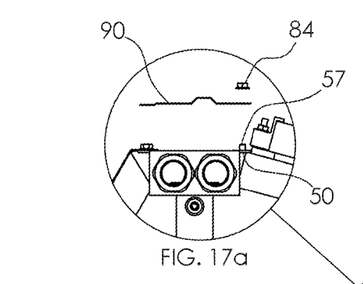
FIG. 17a is a side bubble view of a cap from FIG. 17.

Referring to FIG. 17, 17*a*, an elongate cap 90 formed of galvanized steel or other suitable material is disposed over the EW mounting structures 200 to protect the wiring from exposure to adverse elements, including UV rays. Elongate cap 90 is secured to key 50 on screw 57 with nut 84.

Referring to FIGS. 17, 18*a* and 18*b*, commercially-available single conduit 92 or double conduits 94 may be attached to one or more EW mounting structures. Conduits 92 and 94 include EW long channel punch-out metal plates, insulated compression connectors, thin-wall conduits, and serrated flange locknuts that are conventionally used in solar panel array installations. Wires may be fed (or removed) through conduits 92 or 94 into the open-air channels of the electrical raceway formed by the adjoined NS and EW mounting structures.

The NS and EW mounting structures 100 and 200 with substantially U-shaped channels 15 may be formed of metal, for example aluminum, galvanized steel, or stainless steel. Other suitable materials may be used, for example, PVC, or other durable and wind-resistant polymeric materials.

Figure 19:
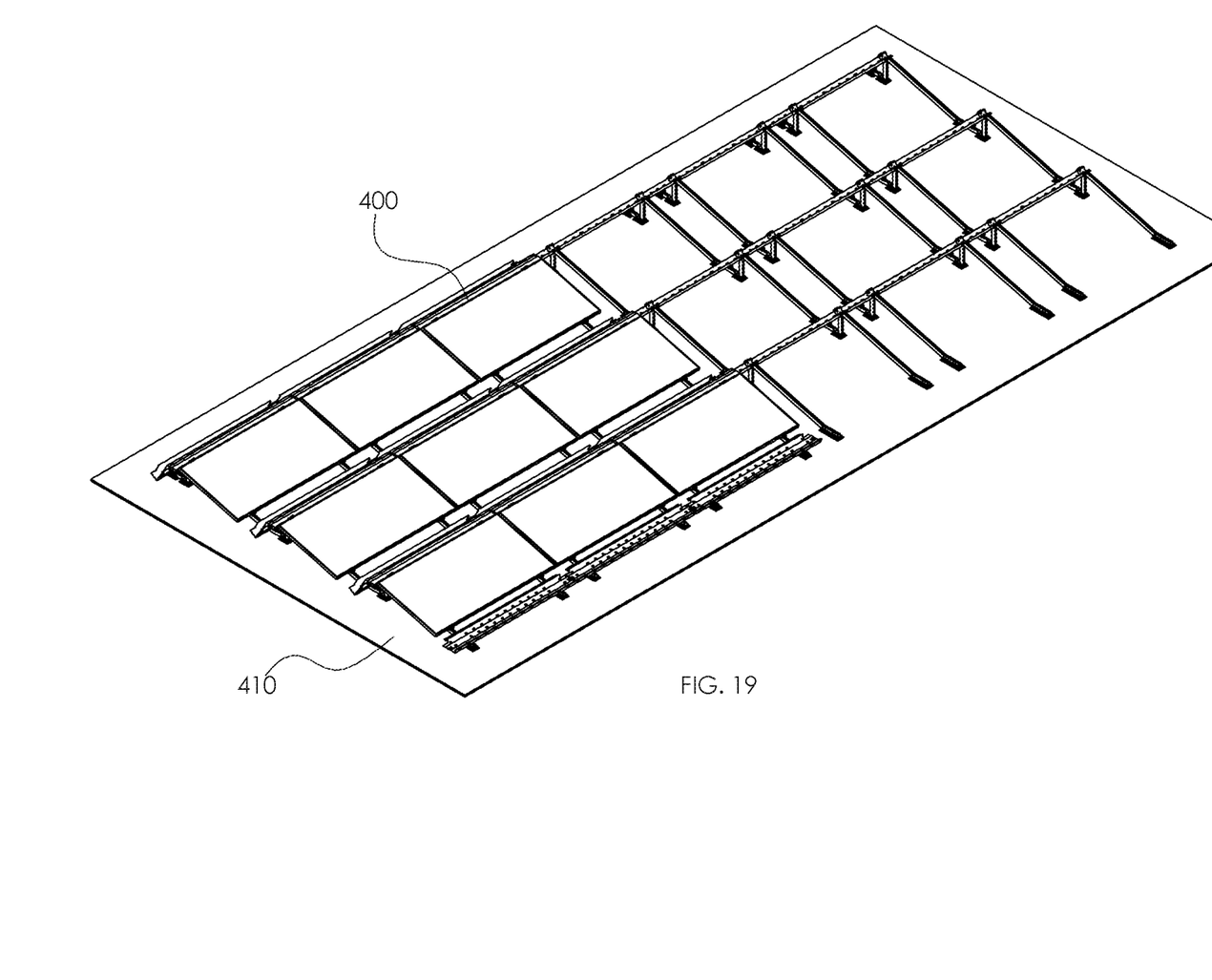
FIG. 19 is an isometric view of a partially completed racking system according to an aspect of the invention.
Figure 20:
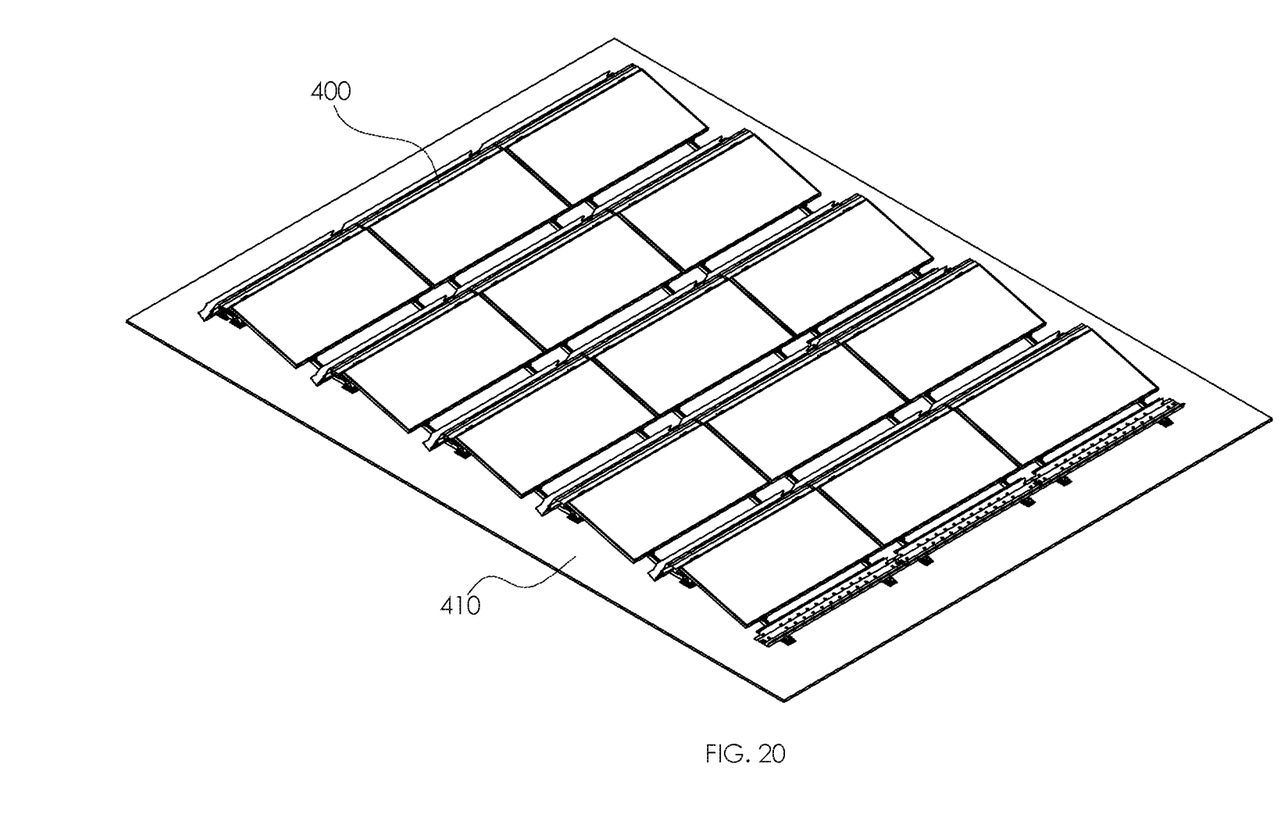
FIG. 20 is an isometric view of a fully-assembled racking system according to an aspect of the invention.

Referring to FIG. 19, a partially assembled racking system configured for receiving eighteen (18) panels is illustrated in an array extending in an E-W direction. Referring to FIG. 20, a fully assembled racking system with 15 panels is illustrated as an array extending in a NS direction.

Figure 21:
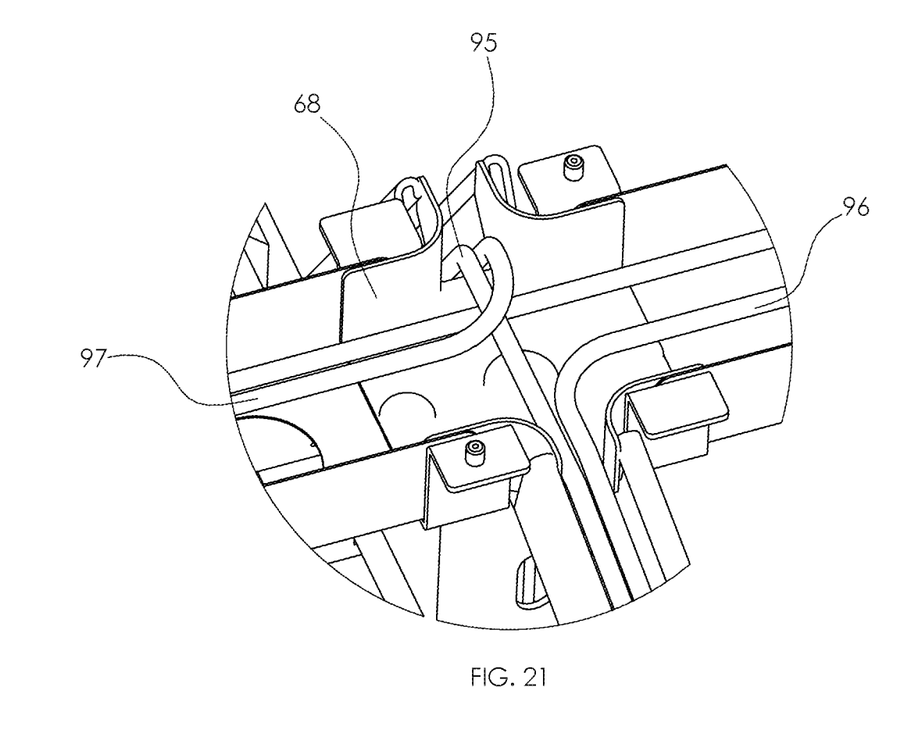
FIG. 21 is an isometric view of the racking system illustrating the N-S and E-W internal interconnections and wiring possibilities within the system.

Advantageously, upon assembly of the system, wires can easily be fed from the electrical raceway into a single conduit 92, as illustrated in FIG. 18*a*, a double conduit 94, as illustrated in FIG. 18*b*, or removed from the raceway through the conduit(s) as needed by the installer. In addition, the N-S and E-W interconnections forming a continuous, integrated raceway allow for DC string wiring to be laid in the open-air channels running N-S and E-W, which allows for easy access to DC string wiring and panel lead connectors throughout the entire installation process. The use of the term integrated is intended to mean that the NS and EW mounting structures, although having different parts, work together as a unit. The intersections of the framework also allow for versatile wire routing options, as illustrated in FIG. 21. Wires may be routed North and South 95, while also being routed N-E 96 or S-W 97, for example, for module or intermodule connectivity. The racking system also allows for multiple jumper row options without incurring additional costs. As another advantage, the wire management racking system eliminates the need for additional hardware, including zip-ties, cable ties, s-hooks, PVC jumper pipes (and associated bell ends and attachment parts). In addition to the above, the racking system can be easily transported or shipped, and can also be adapted to operate with practically any commercially-available framed solar module, regardless of size and style.

The invention has been described with reference to specific embodiments. One of ordinary skill in the art, however, appreciates that various modifications and changes can be made without departing from the scope of the invention as set forth in the claims. For example, although the open-air channels are described as substantially U-shaped and the mounting structures formed of metal, in the use of another material, for example, polyvinylchloride (PVC), the channels would be substantially C-shaped, and formed of a synthetic polymer, instead of a metal. If PVC is used, a channel would be cut along the length of the tubing to allow easy, open-air access by the installer when laying the wiring. In addition, although the tilt angle is described as being between 5-15 degrees, the angle may be outside that range. Accordingly, the specification is to be regarded in an illustrative manner, rather than with a restrictive view, and all such modifications are intended to be included within the scope of the invention.

What is claimed is:

1. A framed photovoltaic (PV) module racking system, comprising: a North-South oriented sub-assembly, comprising:
    a plurality of North-South (NS) mounting structures, oriented in a North-South direction, each of said NS mounting structures including an NS open-air channel;
    a plurality of NS secondary mounting structures, each of said NS secondary mounting structures coupled to and supporting one of said NS mounting structures;
    an East-West oriented sub-assembly, comprising: a plurality of East-West (EW) mounting structures, oriented in an East-West direction, each of said EW mounting structures including an EW open-air channel;
    a key connector interconnecting each of said NS mounting structures to each of said EW mounting structures;
    wherein, the coupling of said NS mounting structures to said East-West mounting structures forms an integrated framework, wherein said NS oriented sub-assembly supports a plurality of framed photovoltaic (PV) modules, wherein said NS open-air channel and said EW open-air channel forms an interconnected electrical raceway with a plurality of intersections within a solar module array, and wherein at least one of the NS or EW open-air mounting structures includes a base member, and two spaced apart bent arm members extending substantially perpendicularly from the base member a first distance and thereafter extending inwardly a second distance, defining a substantially U-shaped cross-section in which the arm members terminate with an inwardly directed flange.

2. The racking system according to claim 1, further comprising a ballast shield/wind deflector disposed on said NS mounting structures.

3. The racking system according to claim 1, further comprising a plurality of elongate caps disposed over each of said EW open-air channel.

4. The racking system according to claim 1, further comprising a rubber insert disposed onto said key connector.

5. The racking system according to claim 4, wherein said tilt angle ranges between 5 and 15 degrees.

6. The racking system according to claim 1, wherein said NS mounting structures are selectively adjustable to mount a framed PV module at a selected tilt angle.

7. The racking system according to claim 1 mounted on a rooftop surface.

8. The racking system according to claim 7, further comprising foot pads.

9. The racking system according to claim 8, wherein said framed PV modules are coupled to said NS mounting structures of said integrated framework with adjustable clamps.

10. The racking system according to claim 9, wherein each of said
adjustable clamps comprises:
a rotatable clamp base;
a spring;
a clamp bolt, and
a clamp top including a serrated ledge and aperture extending therethrough.

11. The racking system according to claim 1, mounted on a ground surface.

12. A method for mounting a racking system for framed photovoltaic (PV) modules, comprising:
providing a North-South oriented sub-assembly, comprising:
a plurality of North-South (NS) mounting structures, oriented in a North-South direction, each of said NS mounting structures including an NS open-air channel;
a plurality of NS secondary mounting structures, each of said NS secondary mounting structures coupled to and supporting one of said NS mounting structures;
providing an East-West oriented sub-assembly, comprising: a plurality of East-West (EW) mounting structures, oriented in an East-West direction, each of said EW mounting structures including an EW open-air channel;
interconnecting each of said NS mounting structures to each of said EW mounting structures with a key connector;
wherein, the coupling of said NS mounting structures to said East-West mounting structures forms an integrated framework, wherein said NS oriented sub-assembly supports a plurality of framed photovoltaic (PV) modules, wherein said NS open-air channel and said EW open-air channel forms an interconnected electrical raceway with a plurality of intersections within a solar module array, and wherein at least one of the NS or EW open-air mounting structures includes a base member, and two spaced apart bent arm members extending substantially perpendicularly from the base member a first distance and thereafter extending inwardly a second distance, defining a substantially U-shaped cross-section in which the arm members terminate with an inwardly directed flange.

13. The method according to claim 12, further comprising the step of mounting a ballast shield/wind deflector onto the NS mounting structures.

14. The method according to claim 13, further comprising the step of mounting an elongate cap over the EW mounting structures.

15. The method according to claim 13, wherein said racking system is mounted onto a roof surface.

16. The method according to claim 13, wherein said racking system is mounted on the ground.

17. The method according to claim 12, further comprising the step of placing a rubber insert over said key connector.

18. The method according to claim 12, further comprising the step of coupling framed PV modules to said NS mounting structures with adjustable clamps.

19. The racking system according to claim 12, wherein a face of the clamp top is positioned on a top face of the inward extension and the rotatable clamp base is positioned in contact with a bottom face of the inward extension.

20. A framed photovoltaic (PV) module racking system, comprising: a North-South oriented sub-assembly, comprising:
a plurality of North-South (NS) mounting structures, oriented in a North-South direction, each of said NS mounting structures including an NS open-air channel;
a plurality of NS secondary mounting structures, each of said NS secondary mounting structures coupled to and supporting one of said NS mounting structures;
an East-West oriented sub-assembly, comprising: a plurality of East-West (EW) mounting structures, oriented in an East-West direction, each of said EW mounting structures including an EW open-air channel;
a key connector interconnecting each of said NS mounting structures to each of said EW mounting structures, said key connector including a base member, and a bent arm member extending substantially perpendicularly from the base member a first distance and thereafter extending outward a second distance;
wherein, the coupling of said NS mounting structures to said East-West mounting structures forms an integrated framework, wherein said NS oriented sub-assembly supports a plurality of framed photovoltaic (PV) modules, and—wherein said NS open-air channel and said EW open-air channel forms an interconnected electrical raceway with a plurality of intersections within a solar module array.

* * * * *